United States Patent
Provencher et al.

(10) Patent No.: US 10,467,063 B2
(45) Date of Patent: Nov. 5, 2019

(54) TOOL FOR THE AUTOMATIC CONFIGURATION OF INTEROPERABILITY

(71) Applicant: CERNER INNOVATION, INC., Kansas City, KS (US)

(72) Inventors: Ryan Provencher, Downingtown, PA (US); Thomas Connor Liptack, Spring City, PA (US); Jordan Flores, Voorhees, NJ (US); Sachindranath Toutom, Downingtown, PA (US)

(73) Assignee: Cerner Innovation, Inc., Kansas City, KS (US)

( * ) Notice: Subject to any disclaimer, the term of this patent is extended or adjusted under 35 U.S.C. 154(b) by 0 days.

(21) Appl. No.: 15/858,127

(22) Filed: Dec. 29, 2017

(65) Prior Publication Data
US 2019/0205183 A1 Jul. 4, 2019

(51) Int. Cl.
*G06F 9/54* (2006.01)
(52) U.S. Cl.
CPC .................. *G06F 9/541* (2013.01)
(58) Field of Classification Search
CPC ..................................... G06F 9/4862
USPC ......................................... 719/317
See application file for complete search history.

(56) References Cited

U.S. PATENT DOCUMENTS

| | | | |
|---|---|---|---|
| 6,993,717 B2 | 1/2006 | Minninger | |
| 7,054,924 B1 * | 5/2006 | Harvey | H04L 67/303 709/203 |
| 9,158,563 B2 * | 10/2015 | Hoff | G06F 8/61 |
| 9,301,010 B2 * | 3/2016 | Dunne | H04L 65/80 |
| 10,091,055 B2 * | 10/2018 | Sundaram | H04L 41/0806 |
| 10,200,342 B2 * | 2/2019 | Zhuo | H04L 61/2015 |
| 2018/0191814 A1 * | 7/2018 | Kinarti | H04L 67/104 |

* cited by examiner

*Primary Examiner* — Andy Ho
(74) *Attorney, Agent, or Firm* — Shook, Hardy & Bacon L.L.P.

(57) ABSTRACT

Systems and methods enabling the automatic configuration of application environments in a clinical system are disclosed. An interoperability hub can be implemented within a clinical solution made up of a plurality of independent application environments. Each application environment may have an interoperability agent running on it which facilitates communication with the interoperability hub. Each agent running on a specific application environment is configured to look into that system and collect configuration information from that application environment that other systems in the solution require. The configuration information for an application environment can be sent to the interoperability hub and maintained. Further, if that application environment requires any configuration information from any other application environment, it can obtain that information from the interoperability hub and handle that information appropriately with respect to the application environment. The interoperability agent may monitor the application environment for any changes and notify the interoperability hub accordingly.

20 Claims, 9 Drawing Sheets

Transaction History

Date Range Selection:

Start Date: [ ]  End Date: [ ]   Apply   Reset

All Transactions — 516

| Environment | Time Changed: | Changed By: |
|---|---|---|
| 1450 [1512765306188] | Fri Dec 08 2017 15:35:06 GMT-0500 (Eastern Standard Time) | z000kvrv |
| 1450 | Fri Dec 08 2017 15:33:59 GMT-0500 (Eastern Standard Time) | z000kvrv |
| 1450 | Wed Nov 01 2017 08:36:33 GMT-0500 (Eastern Daylight Time) | t1046593 |
| 1450 | Wed Nov 01 2017 08:02:15 GMT-0500 (Eastern Daylight Time) | t1046593 |
| 1450 | Wed Nov 01 2017 08:02:06 GMT-0500 (Eastern Daylight Time) | t1046593 |

Signed in as: z000kvrv   Log Out

TOOL FOR THE AUTOMATIC CONFIGURATION OF INTEROPERABILITY

BACKGROUND

Complex clinical solutions consist of multiple different application systems that work together and are interconnected to provide information to each other to ensure that the various pieces of the solutions, and the solutions as a whole, function properly. One issue with complex systems made up of various application environments is interoperability, which is the ability of the various application environments to connect and communicate readily with one another, for example even if they were developed by different manufacturers or are built on different platforms or coding languages. In complex solutions, the ability to exchange information between applications, databases, and other computer systems is critical, and the various systems and devices that make up those solutions must be able to exchange and interpret shared information. In clinical solutions, interoperability is the capability of disparate applications and systems to exchange and share information from a range of sources, including labs, clinics, pharmacies, hospitals, and medical practices regardless of the applications or software systems being used by those applications.

Conventionally, clinical systems are designed and configured individually for communication. Each application system has its own configuration and maintains its own configuration files, which are different for each application system, i.e. they are not consistent. As such, if there are changes to any of the application systems or their configuration, the entire solution can fail to operate properly and subsequently requires substantial manual research and updating as there is no way to know the dependencies of each application system, what needs to be updated in each application system (e.g., what values need to be updated), and where those updates need to be made (e.g., where those values are stored with respect to the application system). Further, it becomes an arduous manual process to link new application systems or move application systems. There are difficulties with current interoperability techniques to retrieve and apply configuration information, for example many clinical solutions depend heavily on application system versions and it is difficult to determine which versions of the application systems are available and what configuration options they are implemented with, and as such it requires manual tasks to figure out the state of the various application system environments and a lot of research to figure out the correct configuration values to use for those application systems.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the technology described herein are directed towards configuration tooling for clinical system interoperability. Interoperability can be configured between applications using an interoperability hub and remote agents, which are each dedicated to run within an application system environment. All system configuration information and/or data can flow though the interoperability hub, and as such the interoperability hub can know what configuration information is provided by each application system or environment and what configuration information each application system needs so that the interconnected systems are able to communicate and exchange information correctly.

According to some embodiments, an application environment (running an application system) can be linked or otherwise logically connected to an interoperability hub. The application environment can be associated with a particular interoperability agent, which is dedicated to that application environment and facilitates communication between the application system and the interoperability hub. Once the application environment is linked to the interoperability hub the application environment may automatically register itself with the interoperability hub. In some embodiments, the registration includes the dedicated interoperability agent collecting configuration information from the application environment and sending it to the interoperability hub, which can then store the configuration information in a global configuration repository. The global configuration repository may be responsible for maintaining configuration information from a plurality of application environments linked to the interoperability hub. In this way, the interoperability hub can manage all the configuration information from all connected systems and, in conjunction with the interoperability agents, facilitate the configuration of all the connected application environments so that those environments can communicate and exchange information with one and other.

In some further embodiments, an interoperability agent can facilitate the configuration of its dedicated application environment with respect to another application environment. The interoperability agent can request configuration information from the interoperability hub that it is missing or needed by the application environment. The configuration information may then be sent to the interoperability agent by the interoperability hub. The interoperability agent, being dedicated to the application environment, automatically handles the received information with respect to the application environment such that the application environment is correctly configured with respect to the other application environment.

In some further embodiments, interoperability agents running in a dedicated application environment can monitor the application environment for any changes. If something changes in the monitored application environment, the interoperability agent can recognize the change and send an update to the interoperability hub. In turn, the interoperability hub can operate to notify any other connected application environments of the change or update via their dedicated interoperability agents. According to embodiments provided herein, the interoperability hub enables the creation and management of a shared automated configuration system.

Additional objects, advantages, and novel features of the invention will be set forth in part in the description which follows, and in part will become apparent to those skilled in the art upon examination of the following, or can be learned by practice of the invention.

BRIEF DESCRIPTION OF THE DRAWINGS

Aspects of the technology presented herein are described in detail below with reference to the attached drawing figures, wherein.

DETAILED DESCRIPTION

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" can be used herein to connote different elements of methods employed, the terms should not be interpreted as implying any particular order among or between various steps herein disclosed unless and except when the order of individual steps is explicitly described.

According to some aspects of the technology described herein, an interoperability hub can be implemented in a computing system, such as a clinical system, to automate and streamline the consistency of the configuration of the various applications and application environments that make up the system. The interoperability hub may be linked to each system application environment independently so as to form a centralized system configuration, i.e., each application system or application environment is linked to the central interoperability hub. In this way, the interoperability hub may enable the dynamic configuration of linked systems so that those systems maintain proper communication with each other.

According to some aspects, each application system can have an interoperability agent running in that application environment. In some instances, the interoperability agent can be dedicated to a specific application system. The interoperability agent may be made up of one or more modules; for example, in some aspects the interoperability agent can include a base agent and an application specific module. By way of illustration, the interoperability agent may enable communication between the interoperability hub and the application system. In operation, the interoperability agent knows how to look into the application system and can collect information about the application system such as, for example, various configuration information, and send that information to the interoperability hub. The interoperability hub may maintain a global configuration repository based on the information sent to the interoperability hub by the agent. It will be understood that in complex clinical systems, there may be multiple application systems and, thus, multiple interoperability agents dedicated to those application systems. The interoperability hub may function as a repository of information from all the systems connected to it. The interoperability hub may, therefore, know what information each application system provides as well as what information each application system requires.

In some further aspects, an interoperability agent can learn about the application system as it is running in the same environment. In one instance, an interoperability agent can learn the information that its application system has including the types of information (and their data types within the application system), the associated values, or value ranges, and where those values are stored within the application system (e.g. database, flat file, or the like). In another instance, an interoperability agent can learn the information that its application system needs, such as information types and values from different application systems with which it communicates (e.g. configuration information from other application systems). In operation, when the interoperability hub is connected to an application system, an interoperability agent dedicated to that application system can collect the information about that application system and send it to the interoperability hub, where it can be maintained in the global configuration repository. Thus, the interoperability hub, through the global configuration repository, knows the information that each application system has and what each application system needs from any of the other connected application systems. The interoperability hub can further send a list to each interoperability agent of the information it needs from that application system. Further, the interoperability agent for a given application system can send a list to the interoperability hub and request configuration information that it needs from any other application system. As such, aspects of the technology described herein enable the automatic configuration of interoperability for clinical systems and provide an improvement over conventional techniques for system configuration and allows experts for a particular application system to set configuration information for that particular system and where it needs that information while still providing for interoperability with other application systems. Further, by employing an interoperability hub and interoperability agents within the system, the interoperability of application systems and environments can rely on those application systems and environments to know what configuration information it has, where that information is stored, what information it needs for itself, and what configuration information it needs to provide to other systems and environments to enable and maintain interoperability.

Figure 1:
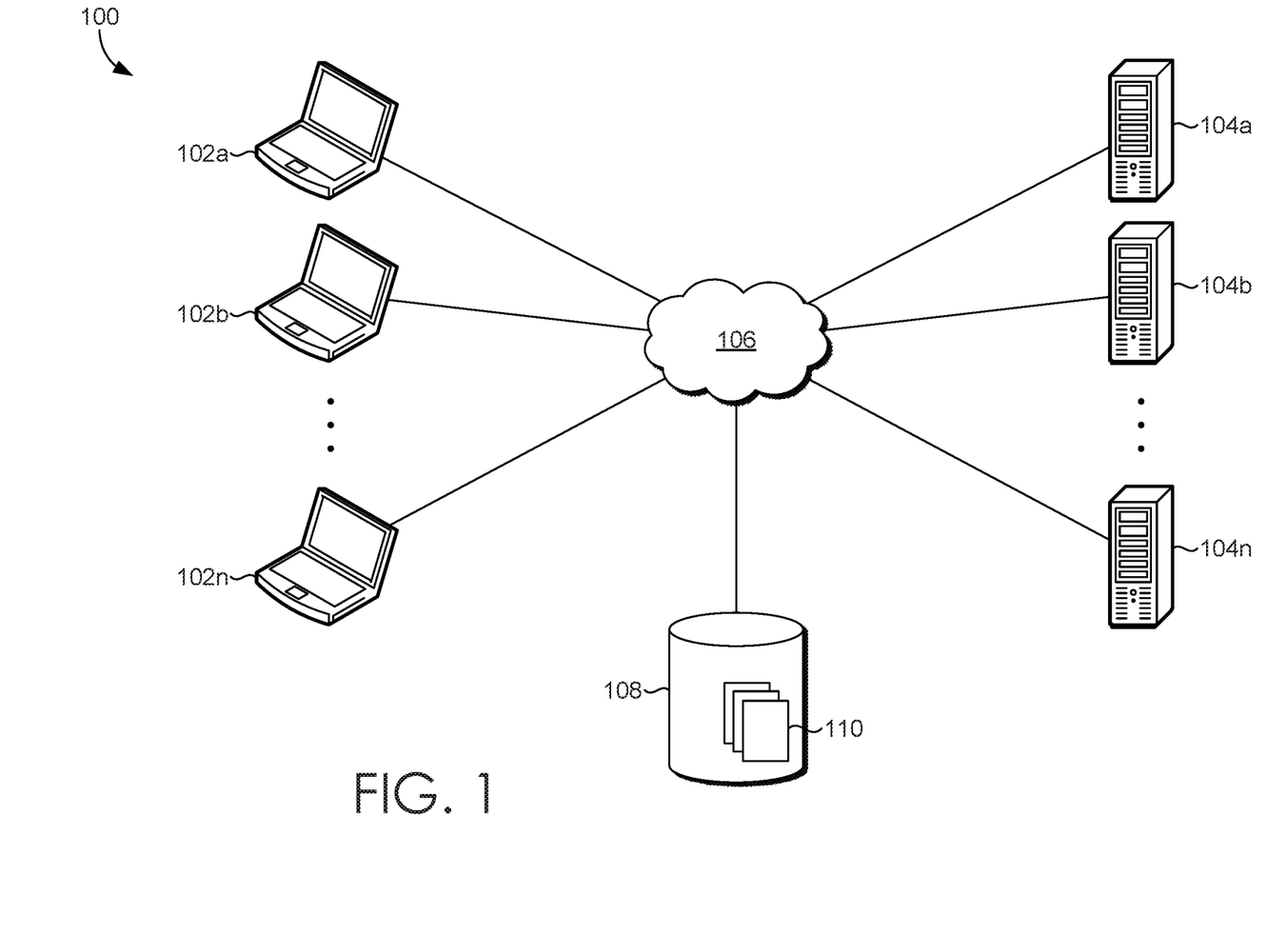
FIG. 1 is an exemplary system diagram in accordance with some aspects of the technology described herein.

Referring now to the figures, with reference to FIG. 1, FIG. 1 depicts a block diagram of an exemplary computing environment 100 in which some embodiments of the present disclosure can be employed. It should be understood that this and other arrangements described herein are set forth only as examples. Other arrangements and elements (e.g., machines, interfaces, functions, orders, and groupings of functions) can be used in addition to or instead of those shown, and some elements can be omitted altogether for the sake of clarity. Further, many of the elements described herein are functional entities that can be implemented as discrete or distributed components or in conjunction with other components, and in any suitable combination and location. Various functions described herein as being performed by one or more entities can be carried out by hardware, firmware, and/or software. For instance, some functions can be carried out by a processor executing instructions stored in memory.

Among other components not shown, example computing environment 100 includes at least one user device, such as user devices 102a, 102b, 102n; a network 106; at least one server, such as servers 104a, 104b, 104n; and at least one data source 108. It should be understood that environment 100 shown in FIG. 1 is an example of one suitable operating environment. Each of the components shown in FIG. 1 can be implemented via any type of computing device, such as computing device 600 described in connection to FIG. 6, for example. These components can communicate with each other via network 106, which can include, without limitation, one or more local area networks (LANs) and/or wide area networks (WANs). In exemplary implementations, network 106 comprises the Internet and/or a cellular network, amongst any of a variety of possible public and/or private networks.

It should be understood that any number of user devices, servers, and data sources can be employed within computing environment 100 within the scope of the present disclosure. Each can comprise a single device or multiple devices cooperating in a distributed environment. For instance, any server 104a, 104b, 104n can be provided via multiple devices arranged in a distributed environment that collectively provide the functionality described herein. Additionally, other components not shown can also be included within the distributed environment.

User devices 102a, 102b, 102n may be client devices on the client-side of computing environment 100, while servers 104a, 104b, 104n may be on the server-side of computing environment 100. Servers 104a, 104b, 104n may comprise server-side software designed to work in conjunction with client-side software on user devices 102a, 102b, 102n so as to implement any combination of the features and functionalities discussed in the present disclosure. This division of operating environment 100 is provided to illustrate one example of a suitable environment, and there is no requirement for each implementation that any combination of servers 104a, 104b, 104n and user devices 102a, 102b, 102n remain as separate entities.

User devices 102a, 102b, 102n can comprise any type of computing device capable of use by a user. For example, in one embodiment, user devices 102a, 102b, 102n can be the type of computing device described in relation to FIG. 6 herein. By way of example and not limitation, a user device can be embodied at least in part as a personal computer (PC), a laptop computer, a cellular or mobile device, a smartphone, a tablet computer, a smart watch, a wearable computer, a personal digital assistant (PDA), a handheld communications device, a consumer electronic device, a workstation, or any combination of these delineated devices, or any other suitable device.

Data storage 108 can comprise data sources and/or data systems, which are configured to make data available to any of the various constituents of computing environment 100, or system 200 described in connection to FIG. 2. For example, in one embodiment, one or more data sources 108 can provide (or make available for access) configuration data or information for storage in interoperability hub 202 or in any application system 206a-206n of FIG. 2. Data source 108 can be discrete from user devices 102a, 102b, 102n and servers 104a, 104b, 104n or can be incorporated and/or integrated into at least one of such components. In some embodiments, data source 108 can comprise a single dataset or a collection of datasets, which can be shared amongst multiple user devices or servers, such as user devices 102a, 102b, 102n and servers 104a, 104b, 104n. In various embodiments, the data source 108 stores a shared collection of datasets that can be interpreted, analyzed, processed, or otherwise used by any of the various components of operating environment 200 illustrated in FIG. 2.

Figure 2:
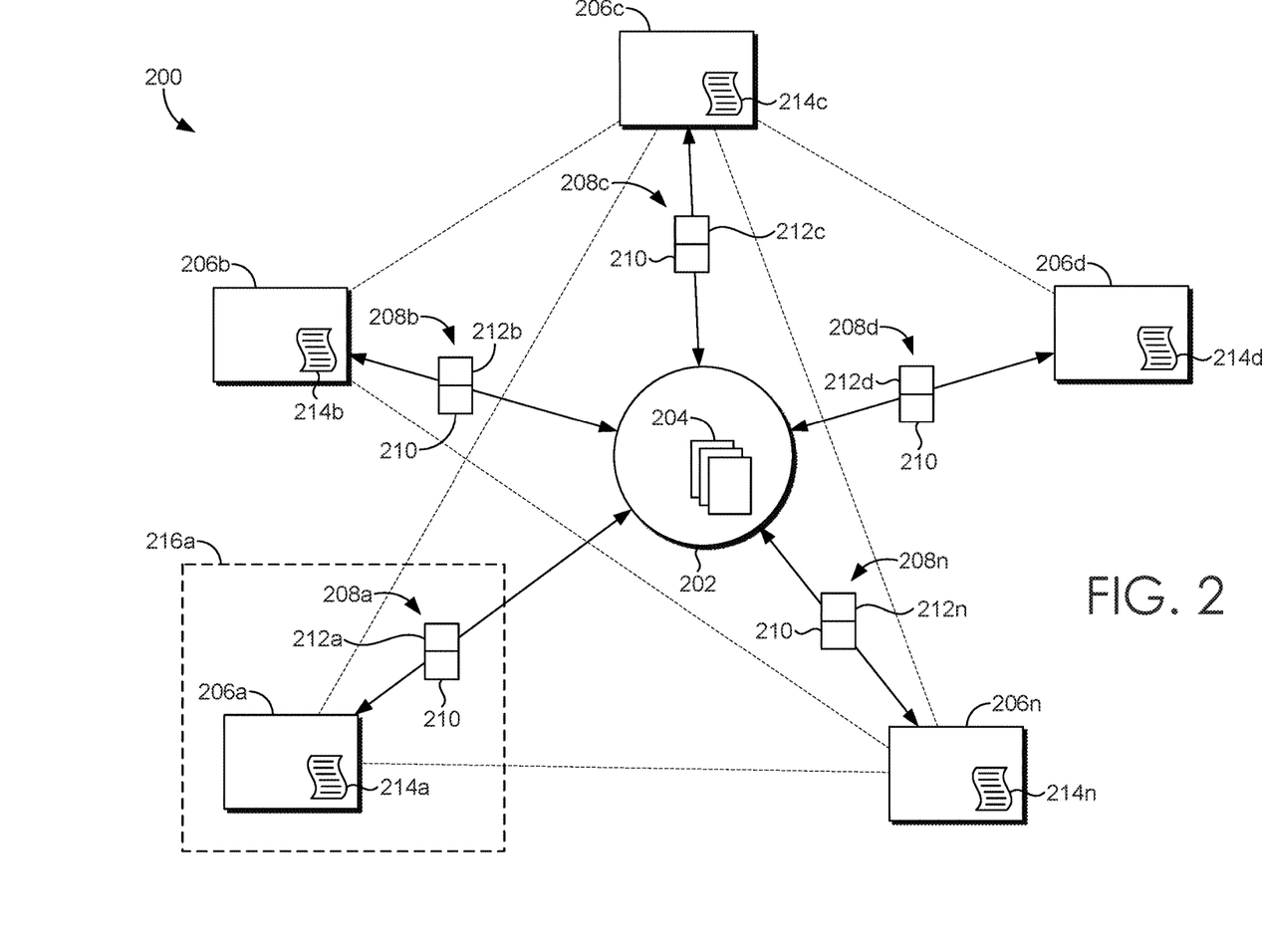
FIG. 2 is a diagram of an exemplary operating environment in accordance with some aspects of the technology described herein.

Computing environment 100 can be utilized to implement one or more of the components of system 200, described in FIG. 2, including components for receiving, providing, and/or handling configuration data or information, processing computer-executable instructions, for example computer-executable instructions for analyzing and configuring various application systems, providing, requesting, and receiving information to and from an interoperability hub, storing computer-executable instructions and configuration data or information, for example in one or more configuration files or one or more databased, communicating with servers 104a, 104b, 104n, user devices 102a, 102b, 102n, and/or other application systems, among other things.

In some embodiments, the functions performed by components of system 200 may be associated with one or more applications, services, or computing routines. In particular, such applications, services, or routines can operate on one or more user devices (such as user device 102), servers (such as server 104), and/or components thereof, and/or can be distributed across one or more user devices and servers, or be implemented in the cloud. Moreover, in some embodiments, the components of system 200 can be distributed across a network, including one or more servers (such as servers 104a, 104b, 104n) and client devices (such as user device 102a, 102b, 102n), in the cloud, or can reside on a user device or server. Moreover, these components, functions performed by these components, or services carried out by these components can be implemented at appropriate abstraction layer(s), such as the operating system layer, application layer, hardware layer, of the computing system(s). Alternatively, or in addition, the functionality of these components and/or the embodiments described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), and Complex Programmable Logic Devices (CPLDs). Additionally, although functionality is described herein with regards to specific components shown in example system 200, it is contemplated that in some embodiments functionality of these components can be shared or distributed across other components.

Continuing with FIG. 2, an exemplary operating environment 200 is provided in accordance with aspects of the technology described herein. An interoperability hub 202 is a tool implemented in a computing system (e.g., a clinical system) that is generally responsible for enabling automatic application configuration and coordination in the clinical system. For example, the interoperability hub 202 can be implemented in a clinical system to create a centralized system configuration, as exemplified by operating environment 200. In some embodiments the interoperability hub 202 is logically coupled or otherwise in operable communication with one or more clinical applications 206a-206n. Each clinical application 206a-206n can receive information, data, or datasets, for example configuration data, from or via the interoperability hub 202. In some embodiments the configuration data can be the types of data needed by the clinical application for operation and the values for each data type. Further, the interoperability hub 202 can send or otherwise push information, data, or datasets, for example configuration data, to any of the clinical applications 206a-206n.

According to some aspects of the technology, the interoperability hub 202 may work in conjunction with one or more interoperability agents 208a-208n. Each interoperability agent 208a-208n may be specific to any one of the clinical applications 206a-206n. For example, interoperability agent 208a may be specific to clinical application 206a and run in application environment 216a. Each interoperability agent 208a-208n may be static for each running application system 206a-206n and is responsible for configuring each application system 206a-206n and handling configuration updates. For example, each interoperability agent 208a-208n can watch for configuration changes in the interoperability hub 202 and be able to retrieve or receive the configuration change information, look into the environment that it is running on, and know how to update the configuration information of the associated application system 206a-206n that it is responsible for. The interoperability hub 202 may be system agnostic and only "interact" with the interoperability agents 208a-208n, receiving and sending different data types and values to and from the various application systems 206a-206n. Each interoperability agent 208a-208n will provide information about its associated application system 206a-206n, (e.g., information needed for its configuration) to the interoperability hub 202 and request information about any application system 206a-206n from the interoperability hub 202 that the associated application system 206a-206n needs.

The interoperability agents 208a-208n may be made up of and include a base agent 210 and an application specific module 212a-212n. For example, interoperability agent 208a can include base agent 210 and application specific module 212a and, as such, operate with clinical application 206a. Accordingly, interoperability agent 208a can run in application environment 216a and is dedicated to application system 206a. Each application environment may have its own interoperability agent 208a-208n. According to some embodiments, each interoperability agent 208a-208n includes the same base agent 210 and different application specific modules 212a-212n. Each interoperability agent 208a-208n may automatically know how to look into its designated application environment 216a-216n and application system (e.g. clinical application 206a) and collect information about that application system that other application systems need. For example, each interoperability agent 208a-208n because of its application specific module can know what application-specific configuration information 214a-214n each application environment has and where it is stored in that application environment. The interoperability agent 208a-208n may send that information to the interoperability hub 202 and store it in a global configuration repository 204. Further, each interoperability agent 208a-208n may know what information the application system it is associated with needs from any of the other systems (e.g. URL, port, environment information such as environment name and application system type, and/or database information) connected to the interoperability hub 202. For example, an interoperability agent 208a-208n can know that it needs a URL and/or a port (which can further include an IP address and protocol type of communication) for another application system to which it is connected. The interoperability agent 208a-208n may further receive information from the interoperability hub 202 and update the configuration of its associated application system 206a-206n (e.g. by updating the configuration file of that application system). In some embodiments, the interoperability hub 202 can push information (e.g. configuration information) to an application system 206a-206n via the interoperability agent 208a-208n associated with a particular system. The interoperability agent 208a-208n can subsequently populate and/or update the appropriate configuration files and/or database(s) corresponding to the particular system. Accordingly, each interoperability agent 208a-208n knows where (e.g. the location within an application environment, configuration file, and/or database) each piece of information it receives from the interoperability hub 202 needs to be inserted. In some instances, an interoperability agent 208a-208n can detect changes in its associated application system and can send any updated information (e.g. configuration information) to the interoperability hub 202 which can then update the global configuration repository 204. For example, an interoperability agent 208a-208n can be configured to check for updated and/or changed information in any configuration file(s) and/or database(s) of its associated application system that may be required by the interoperability hub 202 or by extension and other connected application system 206a-206n. The interoperability agents 208a-208n can be configured to check its own environment and/or the interoperability hub 202 continuously, at regular intervals, at irregular intervals, or in response to a user input or a change in the clinical system (e.g. a new application system or environment is connected to the interoperability hub). The interoperability hub 202 may send the updated information to any of the other connected application systems 206a-206n via their dedicated interoperability agents 208a-208n. Each interoperability agent 208a-208n can continuously monitor its associated application system 206a-206n and know the information that the application system 206a-206n has and what other pieces of information it needs from any of the other application systems 206a-206n in order to operate correctly, for example communicate and exchange information with any connected application systems 206a-206n. Each interoperability agent 208a-208n may further pull in information from the interoperability hub 202 and know how to handle that information for its associated application system 206a-206n, for example how any updates need to be handled with respect to a given application system 206a-206n or where they need to be stored or which application-specific configuration file 214a-214n entries and/or database(s) need to be updated. In one example, an interoperability agent 208a-208n can be configured to check for updated and/or changed information in the global configuration repository 204 that may be required by its associated application system 206a-206n, receive and/or otherwise receive that information, and update its associated application system's configuration file(s) and/or database(s).

Figure 3:
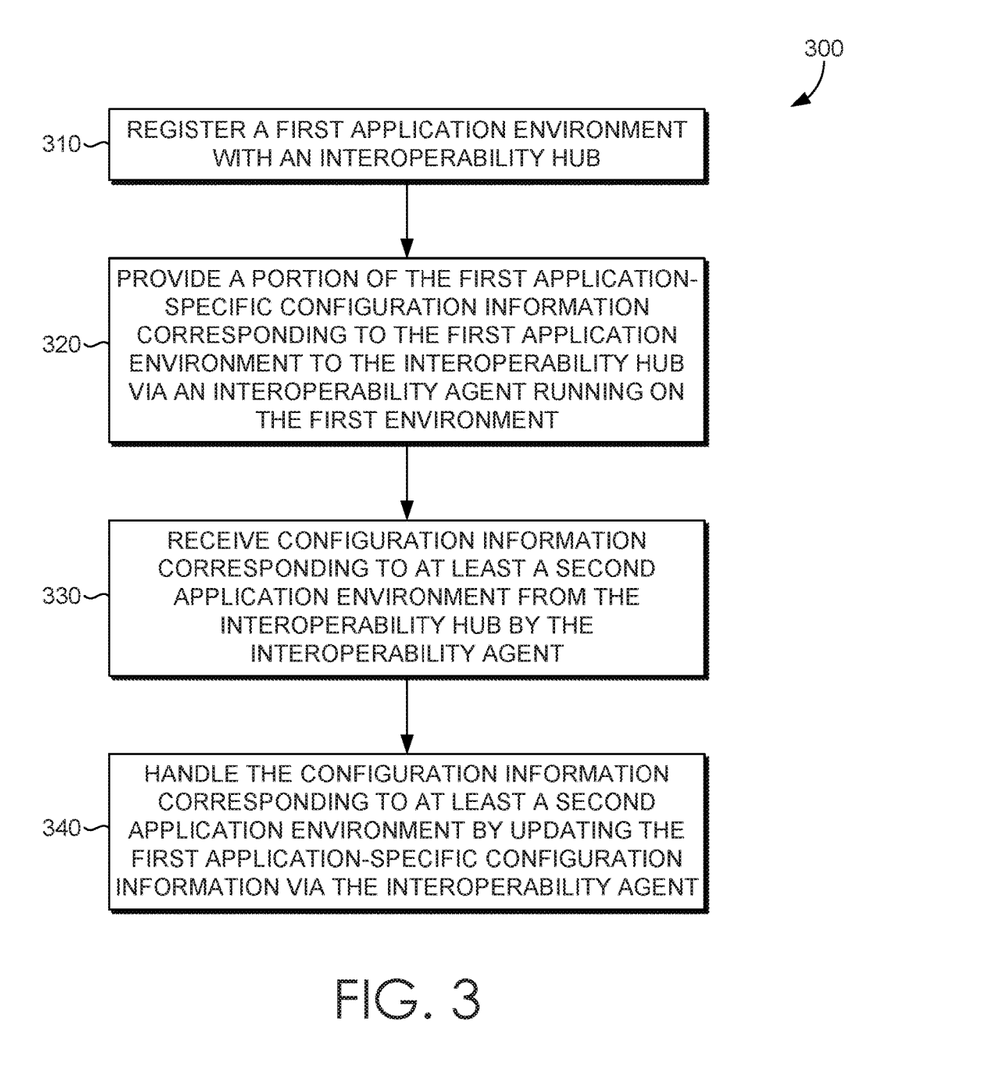
FIG. 3 is a flow diagram showing a method for enabling the automated configuration of linked application systems, in accordance with some aspects of the technology described herein.

Turning to FIG. 3, a flow diagram is provided illustrating one example method 300 for enabling the automatic configuration of application environments in a clinical system. It is contemplated that each block or step of method 300 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a stand-alone application, a service or hosted service (stand-alone or in combination with another hosted service), or a plug-in to another product, to name a few.

At step 310 an application environment can automatically register itself with an interoperability hub. The application environment can register as it is linked or otherwise put in operable communication with the interoperability hub. In some embodiments, the application system can register with the interoperability hub when the interoperability agent specific to that application system is activated (i.e. the application system self-registers with the interoperability hub). In some instances, user input is required (e.g. via a user interface) to allow the application system to register with the interoperability hub. At step 320 an interoperability agent that is running in the application environment can gather and provide data, for example configuration information, to the interoperability hub. The interoperability agent can be configured to know what data may be required by any other connected application system and where that data is located within its own environment. In some instances, the interoperability hub can store the configuration data in a global configuration repository, for example one or more flat files or within a database. In some embodiments an interoperability agent running in the application environment associated with the application system can provide a portion of application specific configuration information corresponding to the application environment to the interoperability hub. The portion of application specific configuration information can be a subset of all configuration information needed for the application environment that may be required by any other interconnected application systems. At step 330 the interoperability agent can receive configuration data or information from the interoperability hub. In some instances the interoperability agent can send a request to the interoperability hub to provide it with configuration information, the request, for example, can be a list comprising data types needed from any interconnected second application environment. Alternatively, the interoperability hub can automatically provide configuration data to the interoperability agent based on one or more changes in the clinical system as a whole, for example if there are changes in any of the other application environments that are registered with the interoperability hub. As such, in some embodiments, the received configuration information may correspond to another application environment that is also linked to the interoperability hub. At step 340, the interoperability agent can automatically handle the received configuration information with respect to the application environment. In some instances the handling comprises locating where in the application environment that configuration data is stored and updating the associated values accordingly, for example, correctly populating or updating the configuration files of that application environment.

Figure 4:
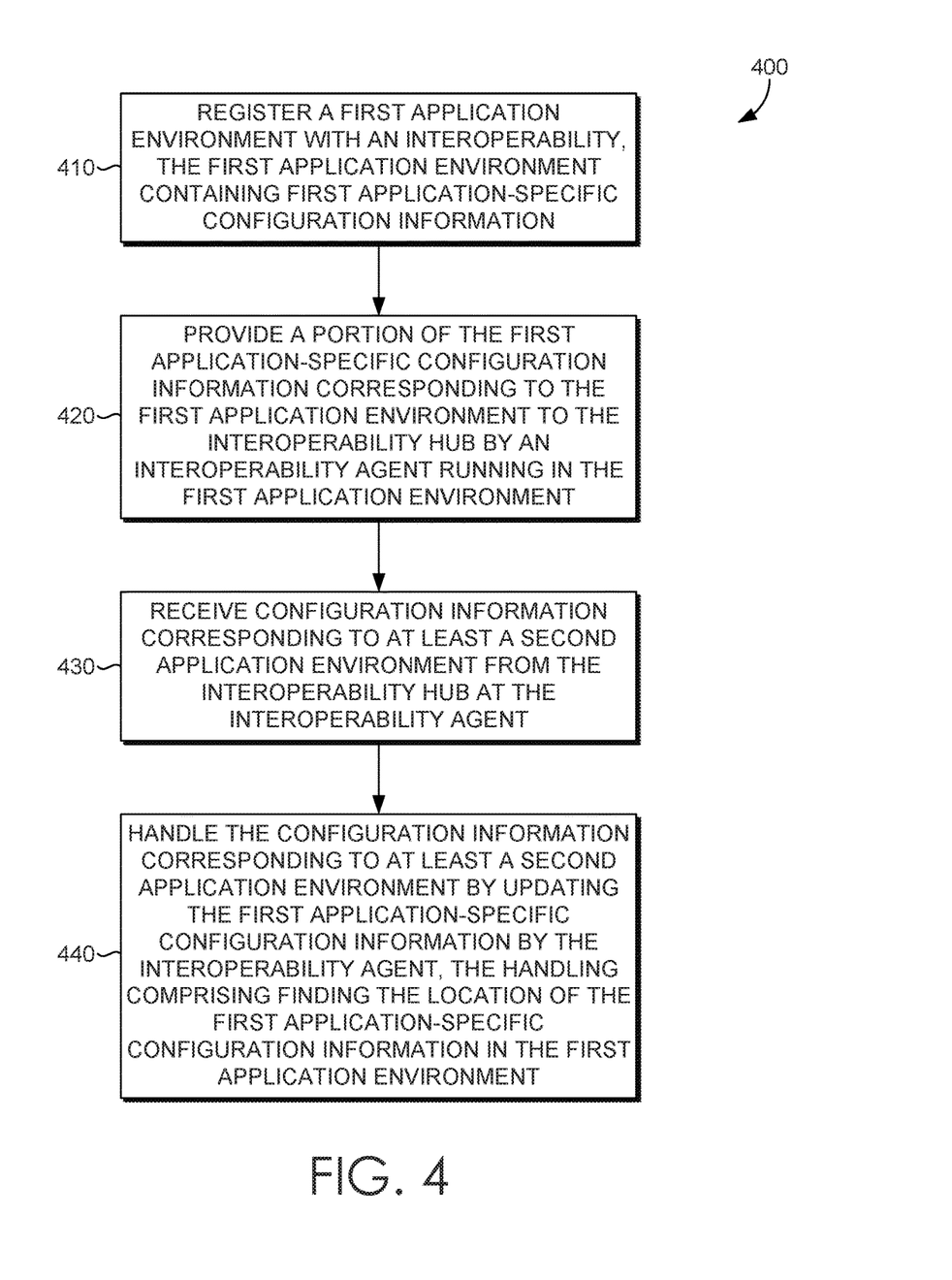
FIG. 4 is a flow diagram showing a method for enabling the automated configuration of linked application systems, in accordance with some aspects of the technology described herein.

Turning to FIG. 4, a flow diagram is provided illustrating one example method 400 for enabling the automatic configuration of application environments in a clinical system. At step 410 an application environment can be automatically registered with an interoperability hub when the two are linked or otherwise put into operable communication. The registering can be done in one or multiple steps, including collecting configuration information from specific locations in the application environment by an interoperability agent that is running in the application environment, and in some instances sending that configuration information to the interoperability hub. In some instances the configuration information sent to the interoperability hub can be application-specific configuration information that is stored in one or multiple configuration files or databases associated with the application environment. The configuration information can be stored by the interoperability hub, for example in a global configuration repository. Once registered, at step 420 the interoperability agent can provide a portion of the application-specific configuration information corresponding to the application environment to the interoperability hub. In some instances the portion of application-specific configuration information can be configuration information that is required by another connected application environment as determined by the interoperability agent or the interoperability hub. At step 430, the interoperability agent can receive configuration information corresponding to another application environment that is linked to the interoperability hub. The configuration information can be received directly from the interoperability hub, and in some instances the configuration information is stored in the global configuration repository of the interoperability hub. At step 440, the interoperability agent can then automatically handle the received configuration information corresponding to the other application environment with respect to interoperability agent's designated application environment. In some instances, the handling comprises finding the location of the application-specific configuration information in the application environment (e.g. where that data is stored, such as a configuration file or database) and updating the application-specific configuration information accordingly.

Turning now to FIGS. 5A-5D example display diagrams showing user interfaces for implementing an interoperability hub are provided. With respect to FIG. 5A, user interface 500 can be provided as a web application and require authentication for a user to log into and operate the interface. User interface 500 can include one or more application systems tabs 502a, 502b, 502n so that a user can navigate to, and work with a particular type of application system. In some embodiments, the application systems can be dynamically incorporated into the interoperability tools, for example each application system can be automatically linked to the hub and the user interface can update itself accordingly. For example, if the application system being linked is a new type of application system, another application system tab can be added. Alternatively, if the application system being linked is the same type as a previously linked application system, various portions of the user interface 500 can be adjusted, for example by adding the newly linked systems as another row application environment list 506. When a user selects a particular application system tab (e.g., application system tab 502a), a listing of available linked environments for the selected application system type are displayed to the user in the application environment list 506. Further, identifying information, such as the application system environment name release version, describing the linked environments can be provided within an environment portion 504 of the user interface 500.

Figure 5A:
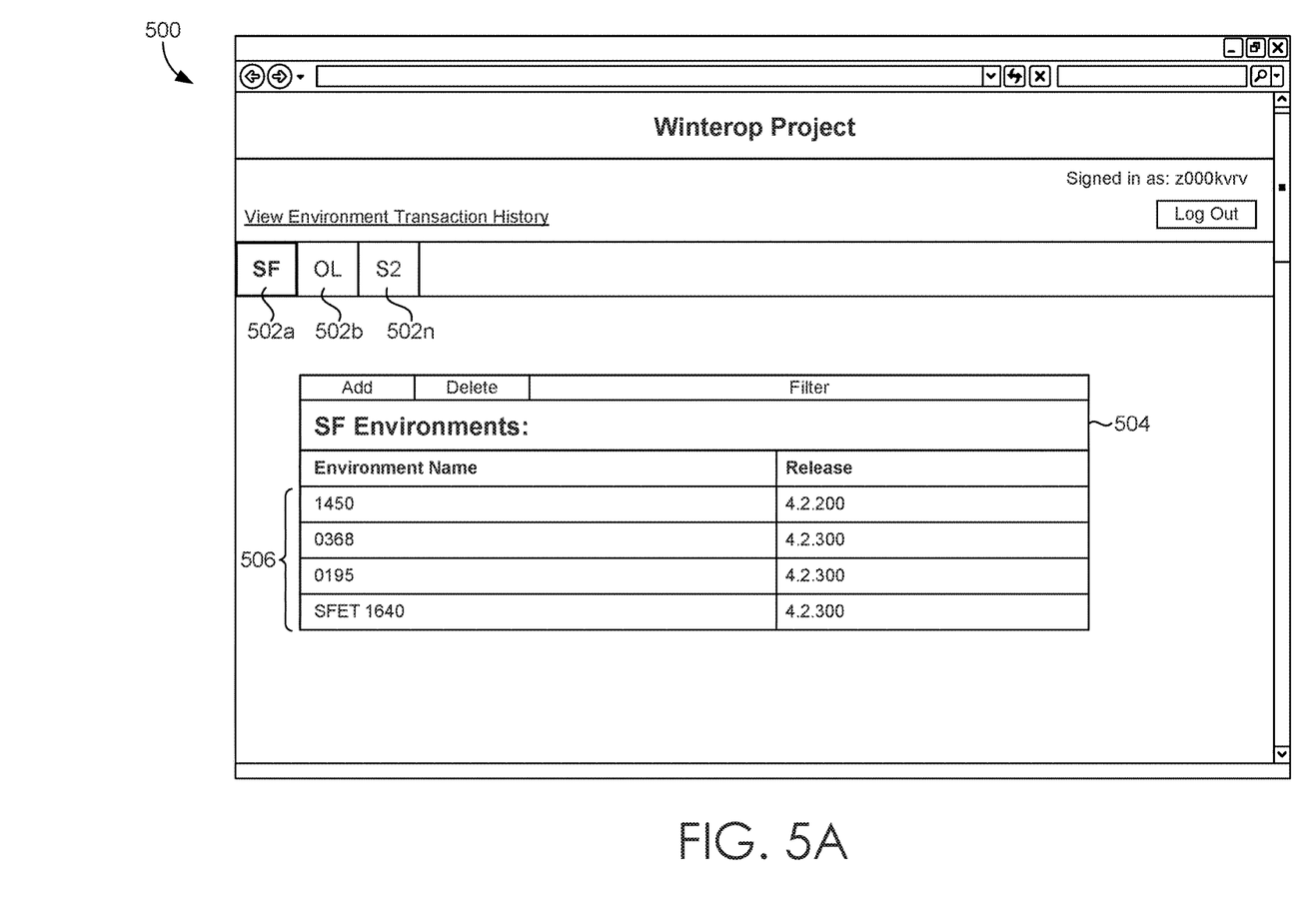
FIG. 5A-5D are display diagrams showing example user interfaces for implementing an interoperability hub, in accordance with some aspects of the technology described herein.
Figure 5B:
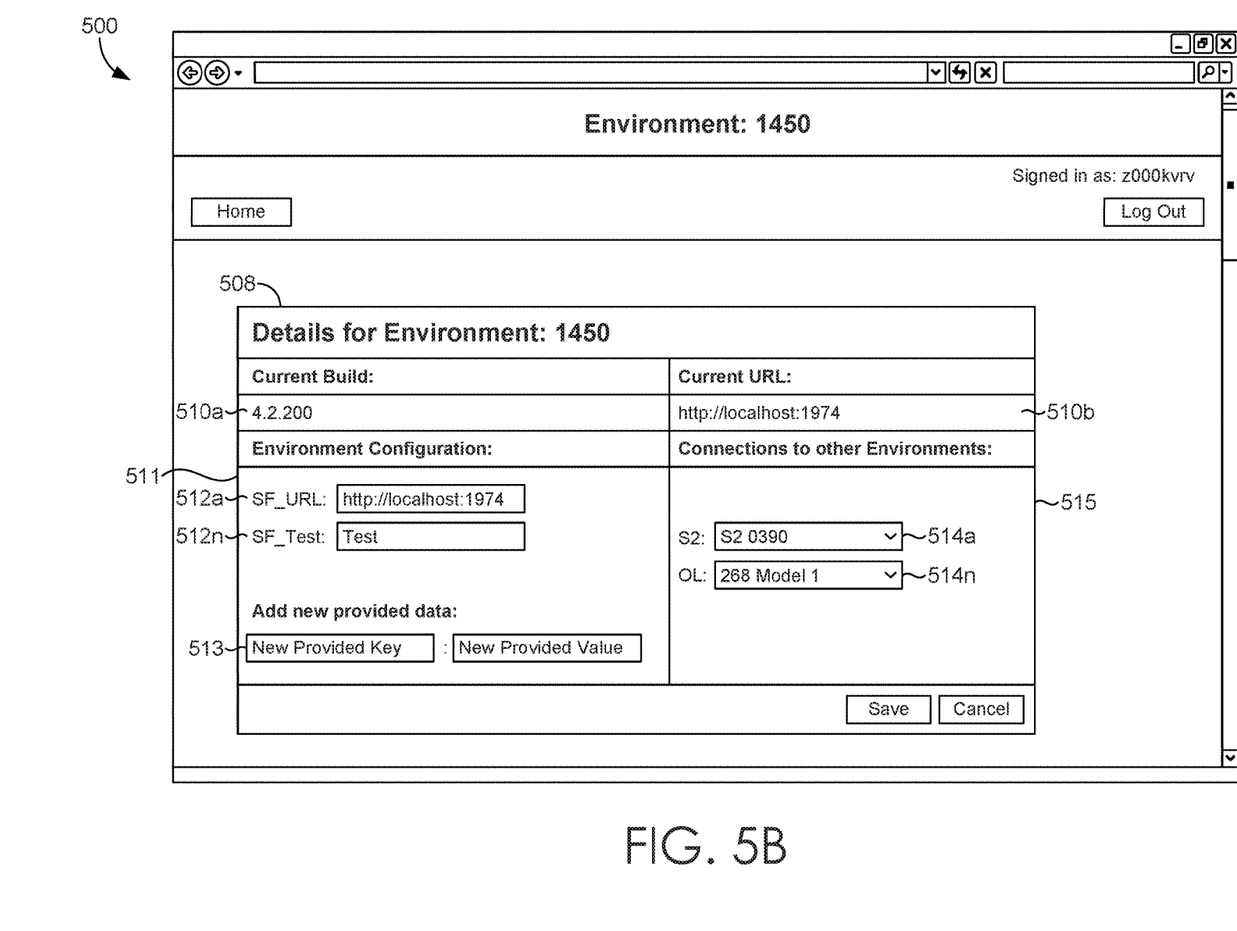

Continuing with FIG. 5B, a user can then select one of the application environments from the application environment list 506 to view details about that environment in an environment details portion 508 of the user interface 500. For example, the environment details portion 508 can include information about the current build 510a as well as the current universal resource locator (URL) 510b of the environment. The environment details portion 508 of the user interface 500 can further include an environment configuration portion 511 and an environment mapping portion 515. Within environment configuration portion 511 and environment mapping portion 515, any configuration properties associated with that environment may be changed or updated.

The environment configuration portion 511 can contain and maintain all the configuration details or information about a given environment. The configuration information 512a, 512n can be provided from the environment to the interoperability hub (such as interoperability hub 202 of FIG. 2) by an interoperability agent (such as interoperability agents 208a-208n) to be displayed by user interface 500. As described above with reference to FIG. 2, an application system running in a given environment maintains its own configuration file (such as configuration files 214a-214n of FIG. 2). According to some aspects of the technology, the interoperability hub is implemented, in part, to maintain a complete and centralized configuration repository (such as global configuration repository 204 of FIG. 2) of the configuration information that needs to be shared with other systems. The interoperability agents (such as interoperability agents 208a-208n of FIG. 2) can know what information is required (i.e. needs to be shared with other systems) from their dedicated application systems (such as application systems 206a-204n of FIG. 2), obtain that information, for example by picking that information from various tables and/or databases), and then send that information to the interoperability hub which stores the various pieces of information in a centralized fashion that is not specific to any environment (such as in global configuration repository 204 of FIG. 2). As the interoperability hub is system type agnostic, based on the global configuration repository it can know a list of properties, for example a data type or key and an associated data value, and the systems that need to be linked to it.

The environment configuration portion 511 can be made up of all the requisite configuration information 512a, 512n needed from a given environment that may be needed by any of the other application systems or environments. Configuration information 512a, 512n can, for example, include a data type or key and an associated data value or range of values. In some embodiments, the configuration portion 511 can include an additional data field 513 that enables a user to add additional configuration information to configuration portion 511.

Figure 5C:
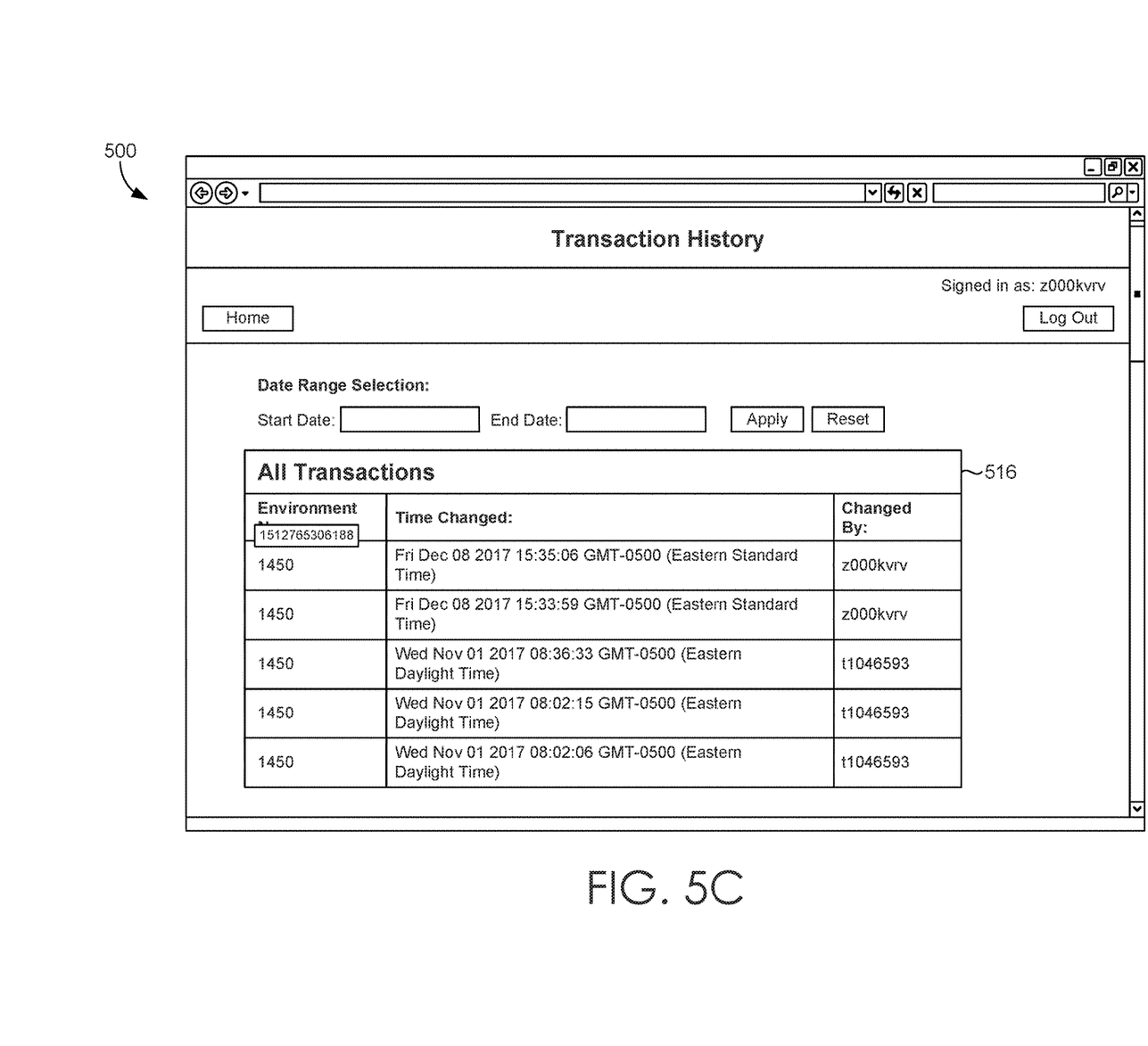
Figure 5D:
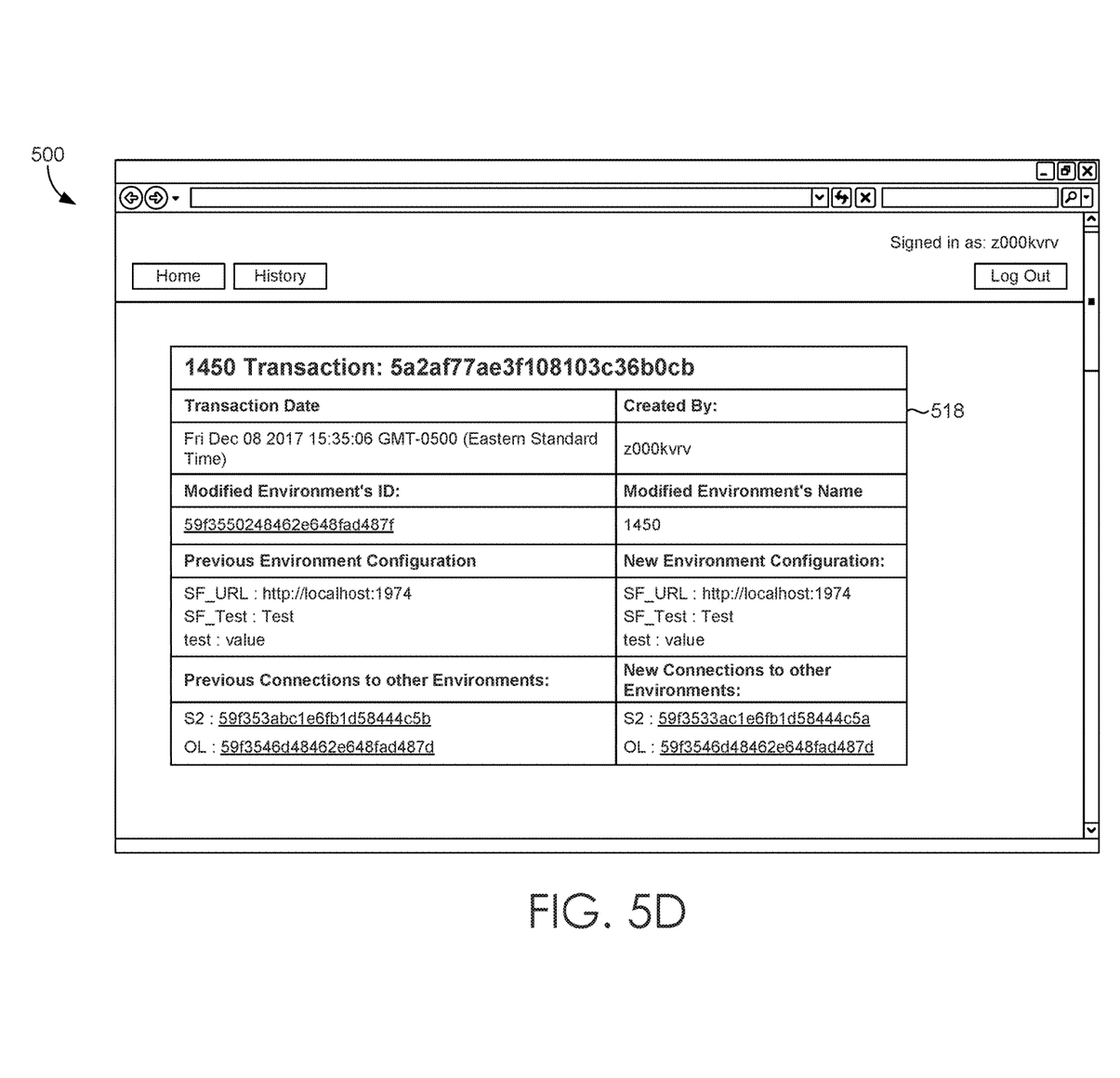

Finally, turning to FIGS. 5C and 5D various portions of user interface 500 are provided for managing the transactional history associated with configuring or otherwise updating an application system or environment. In FIG. 5C, an exemplary transaction history 516 is shown. In some embodiments, the transaction history can display a list of environments that are connected to the interoperability hub that have been changed in some way. In FIG. 5D, an exemplary transaction detail 518 is depicted. For a given record in the transaction history portion 516 of user interface 500, a user can view the details of that record, based on the interface system receiving a user input. The transaction detail can show, among other things, changes in the configuration of a particular environment and/or connections to other application environments.

Accordingly, various aspects of technology for facilitating the automatic backend application configuration in a clinical system is described. It is understood that various features, sub-combinations, and modifications of the embodiments described herein are of utility and can be employed in other embodiments without reference to other features or sub-combinations. Moreover, the order and sequences of steps shown in the example methods 300 and 400 are not meant to limit the scope of the present invention in any way, and in fact, the steps can occur in a variety of different sequences within embodiments hereof. Such variations and combinations thereof are also contemplated to be within the scope of embodiments of the invention.

Figure 6:
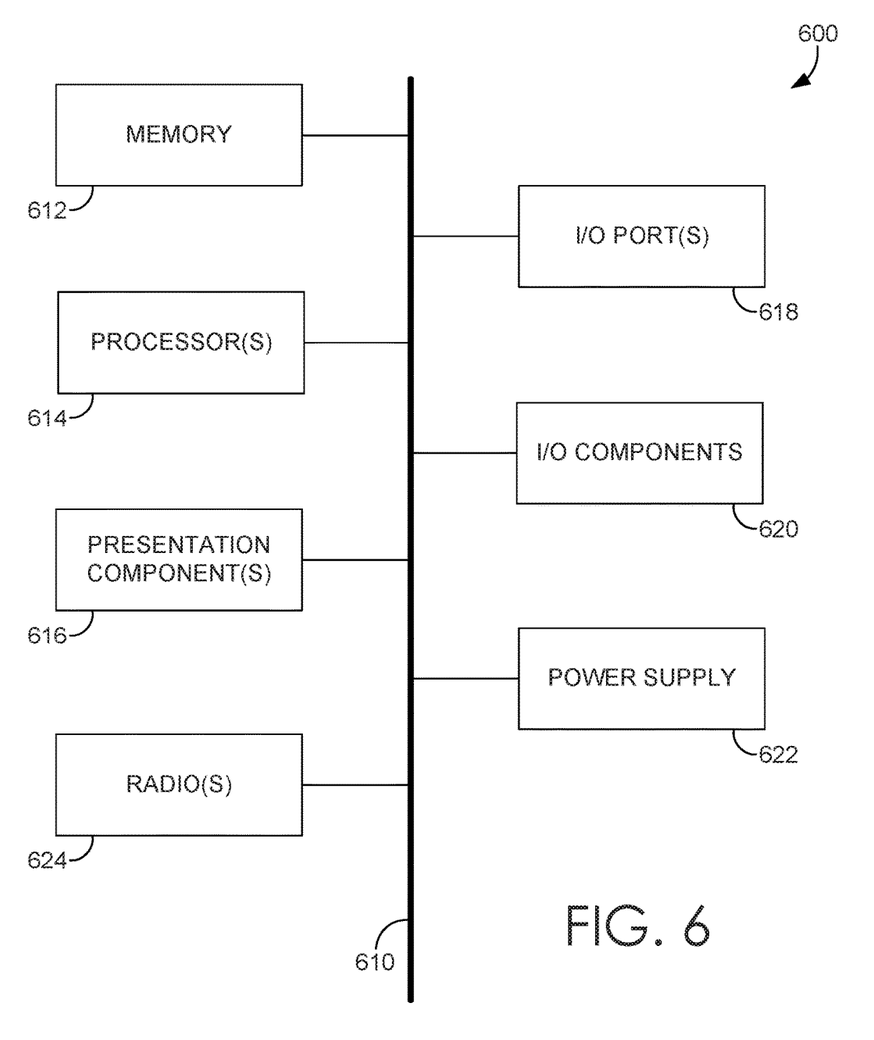
FIG. 6 is a block diagram of an exemplary computing environment suitable for use in implementing embodiments of the technology described herein.

Having described various embodiments of the invention, an exemplary computing environment suitable for implementing embodiments of the invention is now described. With reference to FIG. 6, an exemplary computing device is provided and referred to generally as computing device 600. The computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

Embodiments of the invention can be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the invention can be practiced in a variety of system configurations, including handheld devices, consumer electronics, general-purpose computers, more specialty computing devices. Embodiments of the invention can also be practiced in distributed computing environments where tasks are performed by remote-processing devices that are linked through a communications network. In a distributed computing environment, program modules can be located in both local and remote computer storage media including memory storage devices.

With reference to FIG. 6, computing device 600 includes a bus 610 that directly or indirectly couples the following devices: memory 612, one or more processors 614, one or more presentation components 616, one or more input/output (I/O) ports 618, one or more I/O components 620, and an illustrative power supply 622. Bus 610 represents what can be one or more buses (such as an address bus, data bus, or combination thereof). Although the various blocks of FIG. 6 are shown with lines for the sake of clarity, in reality, these blocks represent logical, not necessarily actual, components. For example, one can consider a presentation component such as a display device to be an I/O component. Also, processors have memory. The inventors hereof recognize that such is the nature of the art and reiterate that the diagram of FIG. 6 is merely illustrative of an exemplary computing device that can be used in connection with one or more embodiments of the present invention. Distinction is not made between such categories as "workstation," "server," "laptop," "handheld device," and "user device," as all are contemplated within the scope of FIG. 6 and with reference to "computing device" or "user device."

Computing device 600 typically includes a variety of computer-readable media. Computer-readable media can be any available media that can be accessed by computing device 600 and includes both volatile and nonvolatile, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 612 includes computer storage media in the form of volatile and/or nonvolatile memory. The memory can be removable, non-removable, or a combination thereof. Exemplary hardware devices include solid-state memory, hard drives, optical-disc drives. Computing device 600 includes one or more processors 614 that read data from various entities such as memory 612 or I/O components 620. Presentation component(s) 616 presents data indications to a user or other device. Exemplary presentation components include a display device, speaker, printing component, vibrating component, and the like.

The I/O ports 618 allow computing device 600 to be logically coupled to other devices, including I/O components 620, some of which can be built in. Illustrative components include a microphone, joystick, game pad, satellite dish, scanner, printer, wireless device. The I/O components 620 can provide a natural user interface (NUI) that processes air gestures, voice, or other physiological inputs generated by a user. In some instances, inputs can be transmitted to an appropriate network element for further processing. An NUI can implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 can be equipped with depth cameras, such as stereoscopic camera systems, infrared camera systems, RGB camera systems, and combinations of these, for gesture detection and recognition. Additionally, the computing device 600 can be equipped with accelerometers, gyroscopes, magnetometers, and the like that enable detection of motion, position, rotation, and/or orientation. The output of the accelerometers, gyroscopes, or magnetometers can be provided to the display of the computing device 600 to render immersive augmented reality, mixed-reality, or virtual reality.

Some embodiments of computing device 600 can include one or more radio(s) 624 (or similar wireless communication components). The radio 624 transmits and receives radio or wireless communications. The computing device 600 can be a wireless terminal adapted to receive communications and media over various wireless networks. Computing device 600 can communicate via wireless protocols, such as code division multiple access ("CDMA"), global system for mobiles ("GSM"), or time division multiple access ("TDMA"), as well as others, to communicate with other devices. The radio communications can be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection can include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection can include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the present invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and can be employed without reference to other features and sub-combinations and are contemplated within the scope of the claims.

What is claimed is:

1. A system for enabling the automatic configuration of application environments in a clinical system, the system comprising a processor and a computer-storage medium storing instructions thereon that, when used by the processor, cause the processor to:
   receive, by an interoperability hub for managing the centralized configuration of a plurality of linked environments, configuration information corresponding to each environment of the plurality of linked environments;
   provide, by a first interoperability agent comprising a base agent and an application-specific module and associated with a first application environment and in communication with the interoperability hub, at least a portion of first application-specific configuration information to the interoperability hub; and
   request, by the first interoperability agent, configuration information corresponding to at least a second application environment from the interoperability hub.

2. The system of claim 1, wherein the application-specific module of the first interoperability agent comprises a list of data types of the first application-specific configuration information and where each data type is stored in the first application environment.

3. The system of claim 1, wherein the first interoperability agent selects the portion of the first application-specific configuration information from the first application environment based on a request from the interoperability hub.

4. The system of claim 1, further comprising: a global configuration repository associated with the interoperability hub, the global configuration repository maintaining at least the first application-specific configuration information and second application-specific configuration information.

5. The system of claim 2, wherein the application-specific module comprises a configuration list, the configuration list defining the data types of the configuration information corresponding to the at least a second application environment and where each data type is stored in the first application environment.

6. The system of claim 5, wherein the first interoperability agent sends a request for configuration information to the interoperability hub based at least in part on the configuration list, and responsive to receiving configuration information corresponding to the at least a second application environment from the interoperability hub, updating the first application-specific configuration information based at least in part on the configuration list.

7. The system of claim 1, wherein the first interoperability agent monitors for a change in the portion of the first application-specific configuration information.

8. The system of claim 7, wherein, based on a determination that there is a change in the portion of the first application-specific configuration information by the first interoperability agent, the first interoperability agent sends a change notification to the interoperability hub, the change notification comprising a data type and an associated value.

9. The system of claim 8, wherein the interoperability hub updates the global configuration repository based on the change notification.

10. The system of claim 8, wherein the interoperability hub provides the change notification to at least a second interoperability agent associated with the at least a second application environment.

11. A computer storage medium storing computer-useable instructions, that, when used by one or more computing devices, cause the one or more computing devices to enable the automatic configuration of application environments in a clinical system, the instructions comprising:
automatically registering a first application environment with an interoperability hub, the first application environment and the interoperability hub being operably linked, and the first application environment containing first application-specific configuration information;
providing, by a first interoperability agent running in the first application environment, a portion of the first application-specific configuration information corresponding to the first application environment to the interoperability hub;
receiving, by the first interoperability agent, configuration information corresponding to at least a second application environment from the interoperability hub; and
automatically handling, by the first interoperability agent, the configuration information corresponding to at the least a second application environment by updating the first application-specific configuration information.

12. The computer storage medium of claim 11, further comprising:
storing, by the interoperability hub, the portion of the first application specific configuration information corresponding to the first application environment in a global configuration repository associated with the interoperability hub, wherein the global configuration repository further contains configuration information corresponding to the at least a second application environment.

13. The computer storage medium of claim 11, further comprising:
detecting, by the first interoperability agent, a change in the portion of the first application-specific configuration information corresponding to the first application environment; and
sending a change notification corresponding to the change to the interoperability hub, the change notification comprising a data type and value.

14. The computer storage medium of claim 13, further comprising:
providing, by the interoperability hub, the change notification to at least a second interoperability agent associated with the second application environment.

15. The computer storage medium of claim 11, further comprising:
determining, by the first interoperability agent, that a particular piece of configuration data is missing from the first application environment; and
sending a request to the interoperability hub for the particular piece of configuration data.

16. The computer storage medium of claim 15, further comprising:
responsive to the request, retrieving, by the interoperability hub, the particular piece of configuration data from a global configuration repository associated with the interoperability hub, and sending the particular piece of configuration data to the first interoperability agent.

17. The computer storage medium of claim 16, wherein the first interoperability agent is designated to automatically handle the particular piece of configuration data with respect to the first application environment, the handling comprising at least one of storing or updating the first application-specific configuration information at a particular storage location.

18. A computer-implemented method for enabling the automatic configuration of application environments in a clinical system, the method comprising:
automatically registering a first application environment with an interoperability hub, the first application environment and the interoperability hub being operably linked, and the first application environment containing first application-specific configuration information;
providing, by a first interoperability agent running in the first application environment, a portion of the first application-specific configuration information corresponding to the first application environment to the interoperability hub;
receiving, by the first interoperability agent, configuration information corresponding to at least a second application environment from the interoperability hub; and
automatically handling, by the first interoperability agent, the configuration information corresponding to at least a second application environment by updating the first application-specific configuration information.

19. The computer-implemented method of claim 18, further comprising:
based on a change in the configuration information corresponding to the at least a second application environment, sending, by the interoperability hub, at least one piece of new configuration information corresponding to the second application environment to the first interoperability agent; and
automatically updating, by the first interoperability agent, the first application-specific configuration information.

20. The computer-implemented method of claim 18, further comprising:
determining, by the first interoperability agent, a change in the first application environment;
sending a change notification corresponding to the change to the interoperability hub, the change notification comprising a data type and value; and
updating a global configuration repository associated with the interoperability hub based on the change notification.

* * * * *

UNITED STATES PATENT AND TRADEMARK OFFICE
CERTIFICATE OF CORRECTION

| | |
|---|---|
| PATENT NO. | : 10,467,063 B2 |
| APPLICATION NO. | : 15/858127 |
| DATED | : November 5, 2019 |
| INVENTOR(S) | : Ryan Provencher et al. |

Page 1 of 1

It is certified that error appears in the above-identified patent and that said Letters Patent is hereby corrected as shown below:

In the Specification

Column 03, Line 12: Please remove "FIG." and replace with --FIGS.--.

Signed and Sealed this
Seventeenth Day of December, 2019

Andrei Iancu
*Director of the United States Patent and Trademark Office*